(12) United States Patent
Akbari et al.

(10) Patent No.: US 11,396,049 B2
(45) Date of Patent: Jul. 26, 2022

(54) TURNING TOOL

(71) Applicant: Diametal A.G., Biel/Bienne (CH)

(72) Inventors: Mansur Akbari, Biel/Bienne (CH); Anthony Paganopoulos, Biel/Bienne (CH)

(73) Assignee: Diametal A.G., Biel/Bienne (CH)

( * ) Notice: Subject to any disclaimer, the term of this patent is extended or adjusted under 35 U.S.C. 154(b) by 260 days.

(21) Appl. No.: 16/741,841

(22) Filed: Jan. 14, 2020

(65) Prior Publication Data
US 2020/0269327 A1   Aug. 27, 2020

(30) Foreign Application Priority Data

Jan. 18, 2019 (DE) .......................... 102019101271.6
Oct. 24, 2019 (DE) .......................... 102019128697.2

(51) Int. Cl.
*B23B 27/16*   (2006.01)

(52) U.S. Cl.
CPC .............................. *B23B 27/1603* (2013.01)

(58) Field of Classification Search
CPC ........ B23B 2200/286; B23B 2200/049; B23B 2200/0447; B23B 27/1607; B23B 27/1603

See application file for complete search history.

(56) References Cited

U.S. PATENT DOCUMENTS

| 8,727,676 | B2 | 5/2014 | Löf |
| 9,925,594 | B2 | 3/2018 | Lof et al. |
| 10,421,128 | B2 | 9/2019 | Lof et al. |
| 2017/0100778 | A1* | 4/2017 | Lof et al. .............. B23B 27/164 |
| 2019/0366443 | A1 | 12/2019 | Lof et al. |

FOREIGN PATENT DOCUMENTS

| AT | 500 864 A1 | 4/2006 |
| CH | 477 249 A | 8/1969 |
| DE | 20 2010 009 471 U1 | 10/2011 |
| EP | 1 736 266 A1 | 12/2006 |
| EP | 1 852 200 A2 | 11/2007 |
| EP | 2 422 905 A2 | 2/2012 |
| EP | 3 153 257 A1 | 4/2017 |
| JP | 2011088256 A * | 5/2011 |
| WO | 2005/118187 A1 | 12/2005 |

OTHER PUBLICATIONS

European Search Report in European Application No. 20000026.3-1017 dated Oct. 23, 2020.

\* cited by examiner

*Primary Examiner* — Alan Snyder
(74) *Attorney, Agent, or Firm* — Collard & Roe, P.C.

(57) ABSTRACT

An indexable cutting insert for a cutting tool for material processing machines has a first axis of symmetry, at least one fastening bore passing through the indexable cutting insert parallel or coaxially to this first axis, two groups of main cutting edges, secondary cutting edges and cutting corners having a second axis of symmetry rotationally symmetrically opposite one another. At least the main cutting edges enclose an acute cutting edge angle with a plane oriented orthogonally to the first axis of symmetry. A cutting insert holder holds and fixes an indexable cutting insert. A recess for receiving the indexable cutting insert is on an elongated base body with polygonal cross-section. A support surface for supporting the indexable cutting insert is rotated about the base-body longitudinal axis and tilted about a second axis, a line of intersection between the rotated support surface and a plane perpendicular to the longitudinal axis.

16 Claims, 8 Drawing Sheets

TURNING TOOL

CROSS REFERENCE TO RELATED APPLICATIONS

Applicant claims priority under 35 U.S.C. § 119 of German Application Nos. 102019101271.6 filed on Jan. 18, 2019 and 102019128697.2 filed on Oct. 24, 2019, the disclosure of which is incorporated by reference.

The invention relates to an indexable cutting insert for a turning tool for material processing machines, in particular metal processing machines, according to the generic term of claim 1, as well as a cutting insert holder for this tool, for receiving and fixing an indexable cutting insert, according to the generic term of claim 9, as well as a turning tool for material processing machines, in particular metal processing machines.

Such cutting devices are already known and used in many different forms and embodiments. In DE 20 2010 009 471 U1, for example, a cutting tool is disclosed which is held and adjusted by two wedge-shaped holder parts which can be moved towards each other.

Double-sided indexable cutting inserts are also known, for example from EP 2 422 905 A2. This indexable cutting insert is especially designed for the effective removal of chips and has, among other things, a main cutting edge which is composed of partial edges at most, and which slopes down from a nose edge extending parallel to the central plane of the indexable cutting insert at an angle of inclination of 3 to 10 degrees, whereby the main cutting edge is moreover composed of partially concave partial cutting edges.

The object of the present invention was to overcome the disadvantages of the state of the art and to provide an indexable cutting insert which is as versatile and also usable for a long time as possible as well as a cutting insert holder which, together with the indexable cutting insert, allows desired cutting geometry to be achieved for the longest possible operating time.

This object is solved by a device according to the claims.

The starting point here is an indexable cutting insert with a first axis of symmetry, wherein at least a first group of main cutting edges are arranged n-fold rotationally symmetrically with respect to the first axis of symmetry, with n preferably greater than or equal to 2, wherein these main cutting edges converge with the respective adjacent first secondary cutting edges in a respective cutting corner of a first group of cutting corners at a corner angle of at most 90 degrees. A fastening bore is also provided passing through the indexable cutting insert parallel or coaxially to the first axis of symmetry. The indexable cutting insert is also constructed rotationally symmetrically by 180 degrees about a second axis of symmetry lying in its central plane and orthogonal to the first axis of symmetry, and has a second group of main cutting edges, secondary cutting edges and cutting corners, which is rotationally symmetrically opposite the first group of main cutting edges, secondary cutting edges and cutting corners about the second axis of symmetry.

Such a cutting insert is characterized according to the invention in that at least the main cutting edges form an acute angle with a plane oriented orthogonally to the first axis of symmetry, which plane includes the associated cutting corners. This means that the respective main cutting edge can fulfil the desired cutting geometry over its entire length, whereby the maximum possible number of main cutting edges for each contour shape of the indexable cutting insert ensures that the indexable cutting insert will function for a long time with the desired cutting geometry.

The preferred angle is between 0.5 and 30 degrees, which means that the indexable cutting insert can be used in conventional material processing machines with a suitable cutting insert holder.

According to an advantageous embodiment of the invention, the cutting corners which are rotationally symmetrically opposite each other, are connected by a symmetrically extending front edge. With a suitable cutting insert holder, any geometries can be achieved on the main cutting edges and the associated cutting corners, which are again retained as long as possible due to the maximum possible number of main cutting edges.

A particularly economically producible and also mechanically stable variant provides for the connection of the cutting corners by a straight front edge, which preferably also encloses an angle of 0 degrees with the first axis of symmetry.

Preferably, the main cutting edges should each merge into an adjoining side edge, which side edges extend parallel to the plane and extend over a corner with an obtuse angle or an arcuate connecting piece to the adjoining secondary cutting edge.

According to a further embodiment of the indexable cutting insert according to the invention, at least the main cutting edges are connected to the mirror-symmetrically opposite secondary cutting edges by a clearance area which, at least in the edge regions adjoining the main cutting edges, encloses an internal angle of between 90 and 60 degrees with a plane oriented orthogonally with respect to the first axis of symmetry which contains the associated main cutting edges, a preferred variant having this angle at 90 degrees.

Advantageously, an indexable cutting insert according to the invention is further characterized in that the groups of main cutting edges, secondary cutting edges and cutting corners and corners, which are rotationally symmetrically opposed to one another about the second axis of symmetry, are connected to one another by edges or surfaces oriented parallel to the first axis of symmetry.

Preferred are geometric embodiments of an indexable cutting insert according to the invention with a symmetry with count n equal to 2 or 3 and thus, respectively, 4 or 6 main cutting edges, secondary cutting edges and cutting corners. This results in an outline of the indexable cutting insert, preferably in a plan view parallel to the first axis of symmetry, which is either diamond-shaped or in the form of a three-ray star. This has proven to be the best combination of mechanical stability, flexibility to set the desired cutting geometry and the highest possible number of main cutting edges for long service life of a single indexable cutting insert.

For optimum results with regard to material processing, an additional feature in accordance with the invention may be that the edge region of the chip face adjoining the main cutting edges forms a concave recess, forming internal wedge angles of less than 90 degrees. Preferably, an advantageous embodiment is additionally provided with at least one chip breaker adjoining it.

For easy orientation of the user when setting up with a new main cutting edge, each chip face belonging to a certain pair of main cutting edge and secondary cutting edge is preferably provided with a marking which is different from all other markings of other chip faces.

In order to solve the initially set object, a cutting insert holder is also part of the present invention, which is used as a constituent of a turning tool for material processing machines, in particular metal processing machines. It is designed to receive and fix an indexable cutting insert, in particular an indexable cutting insert as defined in one of the previous paragraphs, and has a body with a longitudinal axis and a recess for receiving the indexable cutting insert and a structure for releasable connection to fastening means for the indexable cutting insert. For elongated basic bodies, the longitudinal axis typically coincides with their longitudinal center axis and the direction of feed to the workpiece. For differently shaped basic bodies, only the direction of feed of the tool to the workpiece is defined as the longitudinal axis for the explanation of the invention in question. The recess has at least one support surface to support the indexable cutting insert. Preferably, the support surface is used to support the indexable cutting insert in a direction radial to the longitudinal axis of the base body. Particularly preferred are also side walls to support the indexable cutting insert parallel to the longitudinal axis of the basic body and/or in the circumferential direction.

To solve the object set, such a cutting insert holder is characterized in that the support surface is twisted about the longitudinal axis of the base body and tilted about a second axis, which is a line of intersection between the twisted support surface and a plane perpendicular to the longitudinal axis of the base body, the smallest thickness of the base body being below the support surface at the outermost end of the base body. Due to this embodiment of the cutting insert holder, the indexable cutting insert is also positioned in a correspondingly tilted position and fed to the workpiece, which on the one hand enables a cutting geometry that is otherwise not possible with this cutting insert. With an indexable cutting insert as described in the previous paragraphs, certain cutting geometries for all existing main cutting edges can be produced in the same, exactly reproducible way with such a cutting insert holder-indexable cutting insert-arrangement and thus a long functional life can be achieved with only one indexable cutting insert.

In particular, by combining this cutting insert holder with the indexable cutting insert described above, the same geometric characteristics can be ensured for the machining process in the machining zone as for standard tools, for example in accordance with DIN ISO 1832:2012. For example, if a clearance angle of 7 degrees is required, this can only be achieved on one side with conventional inserts. If, on the other hand, according to the present invention, an indexable cutting insert with a nominal clearance angle of 0 degrees is mounted on the cutting insert holder with its doubly tilted support surface, a clearance angle of 7 degrees can again be obtained. Due to the nominal clearance angle of 0 degrees of the indexable cutting insert, however, the indexable cutting insert can be manufactured symmetrically several times, so that after wear of a cutting edge, the indexable cutting insert can simply be turned or tilted and continued to be used with the same geometric relationships. By matching the angles on the indexable cutting insert and the angles by which the support surface on the cutting insert holder is inclined, the conventional geometric relationships, in particular the conventional clearance angles used, can be set for multiple symmetrical inserts.

According to an advantageous embodiment of the invention, it is further provided that the support surface in any plane orthogonal to the longitudinal axis of the base body with a plane perpendicular to the working plane of the tool—which is defined by the direction of feed of the tool and the direction of the main cutting edge—includes an acute angle corresponding to the desired clearance angle.

Furthermore, an embodiment is also preferred in which the support surface encloses an acute angle in any plane parallel to the working plane of the tool with a plane parallel to the longitudinal axis of the base body and transverse to the working plane of the tool, which corresponds to the angle between the longitudinal central plane of the indexable cutting insert to be used and its main cutting edges.

According to a further embodiment according to the invention, the cutting insert holder is characterized in that the support surface in each plane parallel to the longitudinal axis of the base body and to the working plane of the tool encloses with a plane parallel to the longitudinal axis of the base body and transverse to the working plane of the tool an acute angle which corresponds to the angle between the longitudinal central plane of the cutting insert to be inserted and its main cutting edges plus or minus a desired tool setting angle.

A cutting device for solving the above object typically comprises an indexable cutting insert, a rod-shaped cutting insert holder with a recess at one of its ends for receiving the indexable cutting insert, and fastening means for releasably fixing the indexable cutting insert in the receptacle of the cutting insert holder. In particular, such a device is used as a turning tool for material processing machines, in particular metal processing machines.

Advantageously, to solve the task according to the invention, it consists of an indexable cutting insert, as described above, and a cutting insert holder as explained in the previous paragraphs.

According to another embodiment, a cutting device according to the invention consists primarily of a cutting insert which serves to be held in a tool holder. The tool holder itself is part of a processing machine. The cutting insert in turn is the inter-changeable tool of the tool holder. In general, the cutting device in the sense of the invention is a chipping device. When chipping, a cutting angle and a clearance angle must always be set. These angles are guaranteed, on the one hand, by a precise fit of the cutting insert in the cutting insert holder of the tool holder, and, on the other hand, by a precise geometry of the tool holder itself and the correspondingly precisely designed cutting insert. The angles reflect application-dependent empirical values, whereby a first surface and a second surface are designed plane-parallel to each other. Either the first surface or the second surface lies in working position in the tool holder and fixes the cutting insert in interaction with a support surface preferably at right angles to a cutting plane. Depending on the arrangement of the tool holder or the blade holder, the main cutting edges lie overhead, diagonally or horizontally perpendicular with respect to the cutting insert holder. It is particularly important that the main cutting edges, or cutting angles, are at the level of a center line of the rotating workpiece and perpendicular to the tangent at the point of contact with the workpiece, i.e. perpendicular to the vector of the plane of rotation or the cutting plane.

The cutting insert forms a first front edge and a second front edge. The two front edges can have identical parameters, but they can also have different parameters. In this context, parameter means, for example, that the first front edge can be arranged in a first oblique orientation. The second front edge, on the other hand, can be arranged at a different angle or horizontally. The first front edge has a first cutting corner and a second cutting corner at each end. The two cutting corners are the end points of the first front edge. The second front edge has a third cutting corner and a fourth cutting corner at each end. Here, too, these are the two end points of the second front edge.

There is a first surface between the first cutting corner and the fourth cutting corner. The first surface forms a flat side of the cutting insert. There is a second surface on the other flat opposite side of the cutting insert. When viewed from above, the cutting insert has the overall form of a parallelogram.

A through fastening bore which extends through the entire first surface and emerges in the central area of the cutting insert support edge is embedded in the first surface. The through fastening bore is also molded approximately centrally into the first surface. This is a passage that is designed to receive a fastening means to secure the cutting insert on an appropriate cutting insert holder. The fastening means is, for example, a screw, but other types of fastening means may also be provided, such as clamp or toggle connections.

Two main cutting edges are arranged from each of the cutting corners up to a section transition. Afterwards the main cutting edges turn into edges. The edges extend parallel to each other and are arranged essentially at right angles to a first insertion edge or to a second insertion edge. The edges extend to the first or the second insertion edge. Furthermore, the main cutting edges are arranged at a first identical angle or at different angles with respect to the two front edges.

The cutting insert holder has a receptacle into which the cutting insert can be inserted partially protruding. This receptacle in turn has a cutting insert holder support, wherein the cutting insert holder support is arranged at an angle with respect to a base in such a way that the first angle is intercepted in such a way that the main cutting edges can be arranged horizontally or parallel to a base.

The horizontal alignment of the cutting bevel edges, especially an exact angle with respect to the cutting insert holder, is important here, otherwise the angle will not be correct during the cutting process or when using the tool on the processing machine. However, due to the production engineering conditions involved in the manufacture of such a cutting insert, when up to eight such main cutting edges have to be accommodated on a cutting insert, the main cutting edges had to be inclined. In order to compensate for this inclination, i.e. to bring the cutting insert back into the horizontal position with respect to the workpiece to be machined, the cutting insert holder or the receptacle for the cutting insert must also be inclined accordingly.

The inclination of the cutting insert holder support can also be meant in such a way that the main cutting edges are perpendicular or in water. This is especially true for the base of the processing machine.

The first front edge can be inclined at a second angle from the first cutting corner to the second cutting corner; whereas the second front edge can be inclined at a further angle from the fourth cutting corner to the third cutting corner. In addition, a first functional side is formed between the first cutting corner and, on the one hand, the through fastening bore and between the fourth cutting corner and, on the other hand, the through fastening bore of a second functional side. The function sides can be used for different functionalities. The same applies to the fourth functional side, which is formed between the second cutting corner and the through fastening bore and between the third cutting corner and the through fastening bore, where a third functional side is formed. In addition, the first surface or the cutting insert support edge has a first optical marking and a second optical marking. The optical markings are intended to let the user know which side or main cutting edge has already been used and which is still unused.

Furthermore, the user can insert the cutting insert into the cutting insert holder in such a way that either the first surface or the second surface comes to rest on the cutting insert holder support. The user can also determine which of the cutting corners should protrude from the cutting insert holder support and which of the main cutting edges should be used. This leads to a multiple usability of the indexable cutting insert.

Furthermore, a chip breaker is arranged between the two main cutting edges of each of the cutting corners. This serves to improve the functionality of the overall construction. The same applies to a smooth clearance area, which is formed between the two front edges and the two insertion edges.

For a better understanding of the invention, it is explained in more detail by means of the following figures.

They each show in a strongly simplified, schematic representation.

As an introduction, it should be noted that in the differently described embodiments, identical parts are provided with the same reference signs or the same component designations, whereby the disclosures contained in the entire description can be applied analogously to identical parts with the same reference signs or the same component designations. The positional information chosen for the description, e.g. top, bottom, side, etc., are also related to the figure described and shown directly and must be transferred to the new position when the position is changed.

DESCRIPTION OF FIGURES

Independent embodiments of the invention features are shown in the figures, whereby the same reference signs or component designations are used for identical parts. In order to avoid unnecessary repetition, reference is made to the detailed description in the respective preceding figures.

Figure 1:
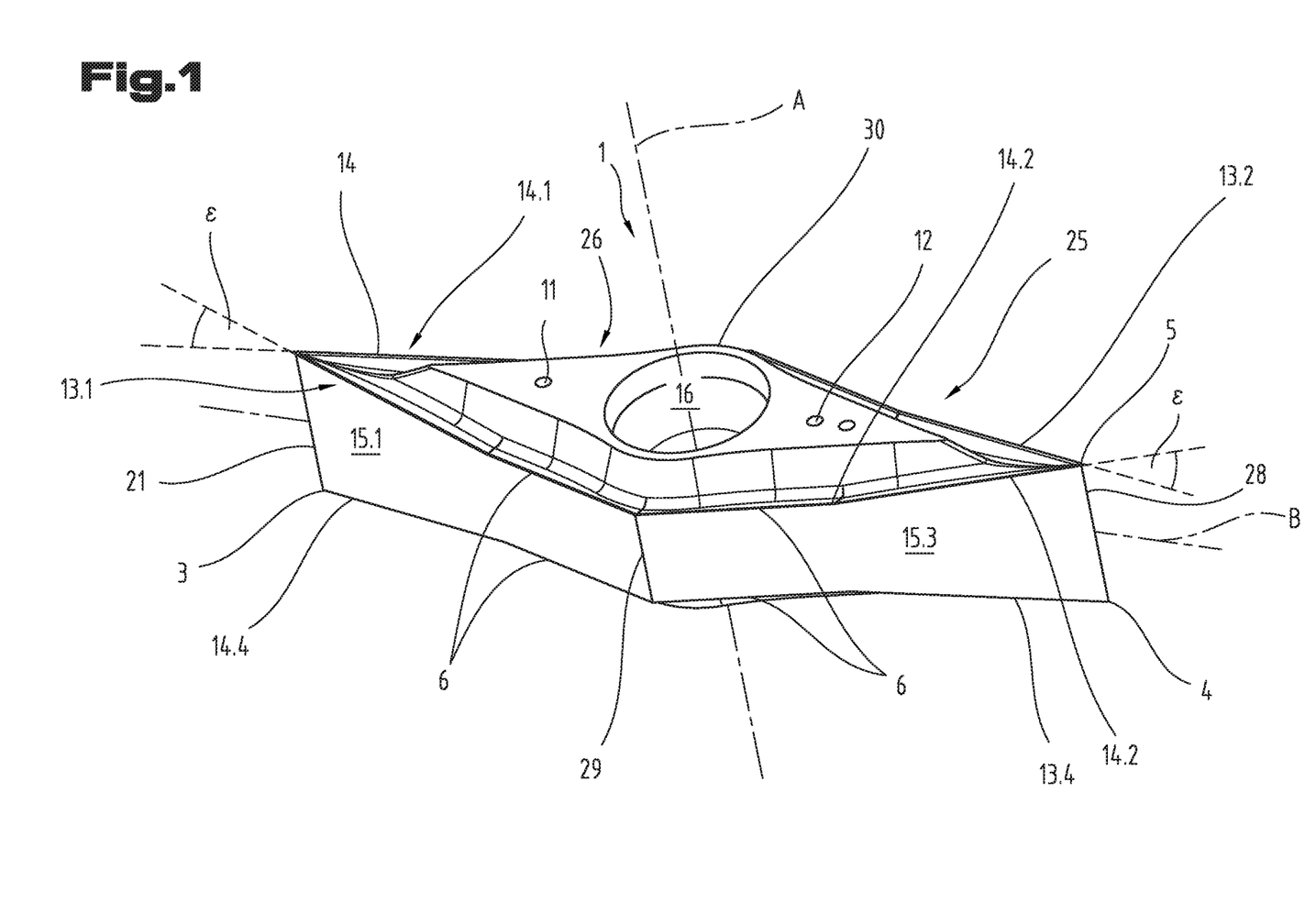
FIG. 1 an indexable cutting insert according to the invention with 2-fold rotational symmetry and a diamond-shaped outline, FIG. 2 the end of a turning tool facing the workpiece using the indexable cutting insert of FIG. 1 in a cutting insert holder according to the invention in side view, FIG. 3 the turning tool of FIG. 2 in front view, FIG. 4 a view from diagonally above on the front end of the turning tool of FIG. 2, FIG. 5 a view as shown in FIG. 4 of a turning tool with an indexable cutting insert according to a further embodiment according to the invention, FIG. 6 a front view of the turning tool of FIG. 2 with a cross-section through the indexable cutting insert just behind the front cutting corner, FIG. 7 a side view of one half of an indexable cutting insert according to another embodiment according to the invention, FIG. 8 a side view of an indexable cutting insert as shown in FIG. 5, FIG. 9 an oblique top view of another embodiment according to the invention of an indexable cutting insert, with 3-fold rotational symmetry and star-shaped outline, FIG. 10 the end of a turning tool facing the workpiece using the indexable cutting insert of FIG. 9 in a cutting insert holder according to the invention in side view, FIG. 11 the turning tool of FIG. 10 in front view, FIG. 12 The front end of an exemplary embodiment of the cutting insert holder as shown in FIG. 2 in side view, FIG. 13 the front end of the cutting insert holder of FIG. 12 as seen from the direction of the machining zone or the workpiece, and FIG. 14 a cross section through the front end of the cutting insert holder of FIG. 12, a little bit behind the tip.

FIG. 1 shows a first embodiment according to the invention of an indexable cutting insert 1 for a turning tool for material processing machines. This has a first axis of symmetry A, around which the indexable cutting insert 1 can be rotated without mixing up the top and bottom sides. The indexable cutting insert 1 is arranged n-fold rotationally symmetrically around this axis of symmetry A. The count n of the rotational symmetry is preferably at least equal to 2 or even greater. It is preferably at n=2 of n=3. FIGS. 1 to 8 illustrate preferred 2-fold rotationally symmetrical embodiments, while the FIGS. 9 to 12 illustrate preferred 3-fold rotationally symmetrical inserts 1.

In all embodiments according to the invention, at least a first group of main cutting edges 13.1 to 13.3 is arranged n-fold rotationally symmetrically with respect to the first axis of symmetry A. These main cutting edges 13.1 to 13.3 converge with adjacent secondary cutting edges 14.1 to 14.3 in cutting corners 2, 5 and 7—the latter for the 3-fold symmetrical shape of FIGS. 9 to 11—of a first group of cutting corners at a point or corner angle ε of maximum 90 degrees. Preferably, the corner angle ε is in the range between 5 and 40 degrees. It should be noted here that the corners can not only be designed with a single radius, but that there can also be embodiments with flat cutting inserts, with several radii or so-called wiper cutting inserts. For mounting the indexable cutting insert 1, a fastening bore 16 is provided parallel or coaxial to the first axis of symmetry A, passing centrally through the indexable cutting insert 1.

In addition to the rotational symmetry explained above, indexable cutting inserts 1 in accordance with the invention are also formed rotationally symmetrical by 180 degrees about a second axis of symmetry B lying in their central plane and orthogonal to the first axis of symmetry A. This applies to all counts of rotational symmetry around the first axis of symmetry A, as can be seen, for example, in FIGS. 1 and 9. On the opposite side of the indexable cutting insert 1 around this second axis of symmetry B there is a second group of main cutting edges 13.4 to 13.6, secondary cutting edges 14.4 and 14.6 as well as cutting corners 3, 4 and 8—the latter again for the 3-fold symmetrical shape of FIGS. 9 to 11—which are rotationally symmetrical around the second axis of symmetry B opposite the first group of main cutting edges 13.1 to 13.3, secondary cutting edges 14.1 to 14.3 and cutting corners 2, 5 and 7. The rotational symmetry advantageously includes the fact that the two top surfaces of the indexable cutting insert 1, which are also the chip faces 25, 26, are essentially of the same design, i.e. have the same surface design and are plane-parallel to each other on average.

It should be mentioned here that indexable cutting inserts 1 without rotational symmetry could also be used, which have all cutting edges on one and the same side with respect to a fastening arrangement on a cutting insert holder. These types of cutting inserts are then formed preferably only rotationally symmetrical around the second axis of symmetry B, preferably 2-fold rotationally symmetrical.

Figure 7:
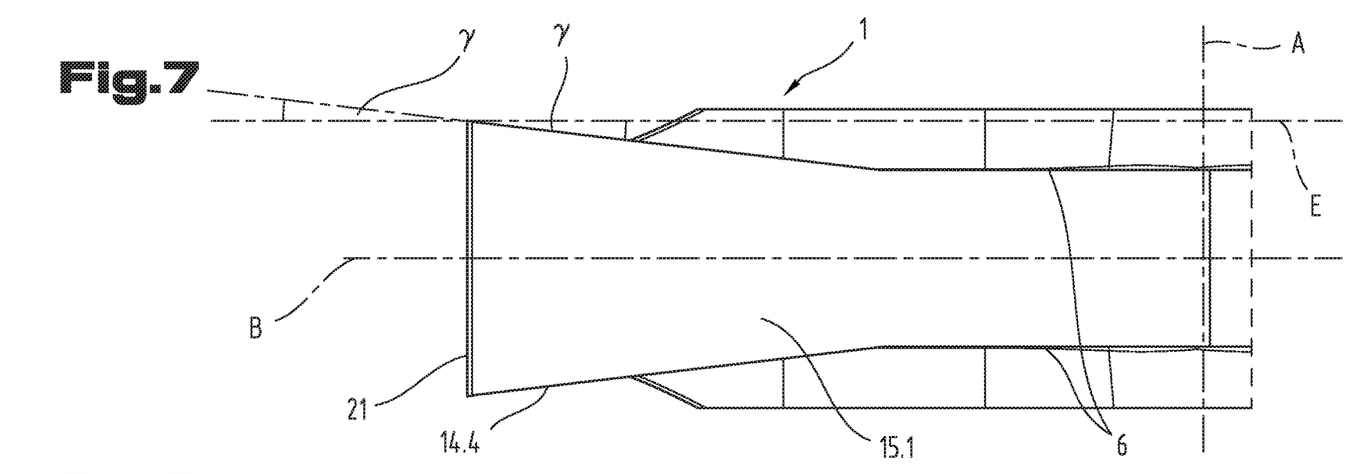
Figure 8:
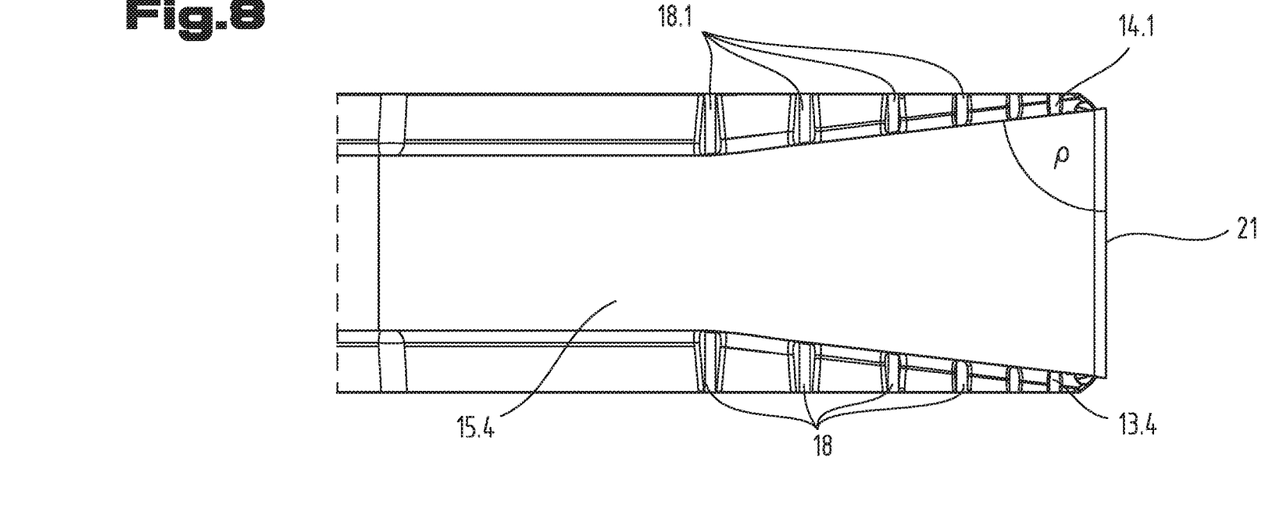

At least the main cutting edges 13.1 to 13.6 enclose an acute cutting edge angle γ as shown in FIG. 7 using the example of the 2-fold indexable cutting insert 1, which, however, applies to all embodiments of indexable cutting inserts 1 according to the invention, starting directly from the respective associated cutting corner 2, 5 or 7, with a plane E oriented orthogonally to the first axis of symmetry A, which includes these cutting corners. The cutting edge angle γ is typically between 0.1 degrees and 70 degrees, preferably between 1 degree and 30 degrees, in particular between 2 degrees and 10 degrees. Preferably, this also applies analogously to the secondary cutting edges 14.1 to 14.4 in all rotationally symmetrical versions of indexable cutting insert 1.

Preferably, the rotationally symmetrically opposite cutting corners 2 and 3, 4 and 5 as well as 7 and 8 are each connected by a symmetrical front edge 21, 28 or 31 to 33 with a front edge angle δ relative to the first axis of symmetry A of between 0 and 30 degrees. The first surface is between the first cutting corner 2 and the fourth cutting corner 5. The first surface is the one flat side of insert 1. A second surface is visible on the other flat side of insert 1. The first surface and the second surface are preferably plane-parallel to each other. Either the first surface or the second surface lies in the working position in a tool holder and the cutting insert 1 is preferably fixed at a right angle to a cutting plane in conjunction with a support surface on the tool holder. Depending on the arrangement of the tool holder or the cutting insert holder, respectively, overhead, inclined or horizontal, the main cutting edges 13 are perpendicular to the cutting insert holder. It is particularly important that the main cutting edges 13 or cutting angles, are at the level of a center line of the rotating workpiece and perpendicular to the tangent at the point of contact with the workpiece, i.e. perpendicular to the vector of the plane of rotation or cutting plane. With a suitable cutting insert holder, any cutting geometries on the main cutting edges and the corresponding cutting corners can be achieved. In most cases, the front edge angle δ of 0 degrees shown in the figures is selected for the connecting line of the opposing cutting corners 2 and 3 or 4 and 5 and the front edge 21, 28 or 31 to 33 also extends as a straight line.

The main cutting edges 13.1 to 13.6 merge at the ends remote from cutting corners 2 to 5, 7 and 8 into side edges 6 which are substantially parallel to plane E. These side edges 6 form a corner with an obtuse angle in the middle area of the 2-fold indexable cutting insert 1 and extend after this corner area to the adjacent secondary cutting edge, e.g. for the main cutting edge 13.1 to the secondary cutting edge 14.2 or for the main cutting edge 13.4 to the secondary cutting edge 14.4 (see FIG. 1). The corners located on the same side with respect to the axis of symmetry A in the course of the side edges 6 are connected by symmetrically extending, preferably straight, insertion edges 29, 30. The first main cutting edge 13.1 and the further main cutting edges 13.2 to 13.6 are arranged according to a special embodiment of the invention again at an oblique angle with respect to the side edges 6 in such an expanding manner that the insertion edges 29, 30 have a shorter length than the two front edges 21, 28. These embodiments with count n=2 each have four main cutting edges and four secondary cutting edges and four cutting corners. This results in a diamond-shaped outline of the indexable cutting insert 1, or a parallelogram, preferably in plan view parallel to the first axis of symmetry A, whereby there is a first insertion edge 29 and a second insertion edge 30 approximately in the middle between the first front edge 21 and the second front edge 28.

For the embodiments with higher count n of rotational symmetry around the axis A, the side edges extend in a concave shape. The side edges can either be rounded and curved towards the axis of symmetry A—as shown in FIGS. 9 to 12 without a kink in the form of a continuous arc—or they can form a corner pointing towards the axis of symmetry A at the position closest to the axis A. For example, for the count n=3 with six main cutting edges, six secondary cutting edges and six cutting corners connected by three front edges, the outline of indexable cutting insert 1 takes the form of a three-radial star due to the acute corner angle ε. Higher counts of n then result in n-radiating stars as the outline of the indexable cutting insert 1.

The main cutting edges 13.1 to 13.6 are each connected to the mirror-symmetrically opposite secondary cutting edges 14.1 to 14.6 by a clearance area 15.1 to 15.6. These clearance areas 15.1 to 15.6 are adjacent to the main cutting edges and are located on the rear side of turning tool 1, 17 with respect to the feed direction of the turning tool. Adjacent clearance areas are separated from each other by the front edges 21, 28 and 31 to 33 as well as by the indexable cutting insertion edges 29 and 30. In the case of the 3-fold rotationally symmetrical insert 1 with the curved transitions between the flank surfaces 15.1 to 15.6, these merge into each other via curved surfaces. Furthermore, an optional feature is that the clearance areas 15.1 to 15.6, at least in their edge regions adjacent to the main cutting edges 13.1 to 13.6 with a plane H, which is defined by the main cutting edge 13.1 to 13.6 and secondary cutting edge 14.1 to 14.6 adjacent to a certain cutting corner 2 to 5, 7 and 8—and which is indicated by dashes in FIG. 2 and FIG. 6—form a wedge angle β of between 90 and 60 degrees.

Preferably, the wedge angle β is exactly 90 degrees, resulting in clearance areas 15.1 to 15.6 parallel to the first axis of symmetry A. Together with the preferably straight front edges, which are parallel to the axis of symmetry A, this results in a preferred embodiment of the indexable cutting insert whereby the nominal clearance angle is 0 degrees. Due to the completely straight front edges as well as completely flat clearance areas, such indexable cutting inserts 1 can be manufactured particularly easily and without costly reworking by a sintering process. These indexable cutting inserts 1 are easy to demold and are already available in the desired geometric shape immediately after demolding, so they do not require any time-consuming post-processing.

Figure 9:
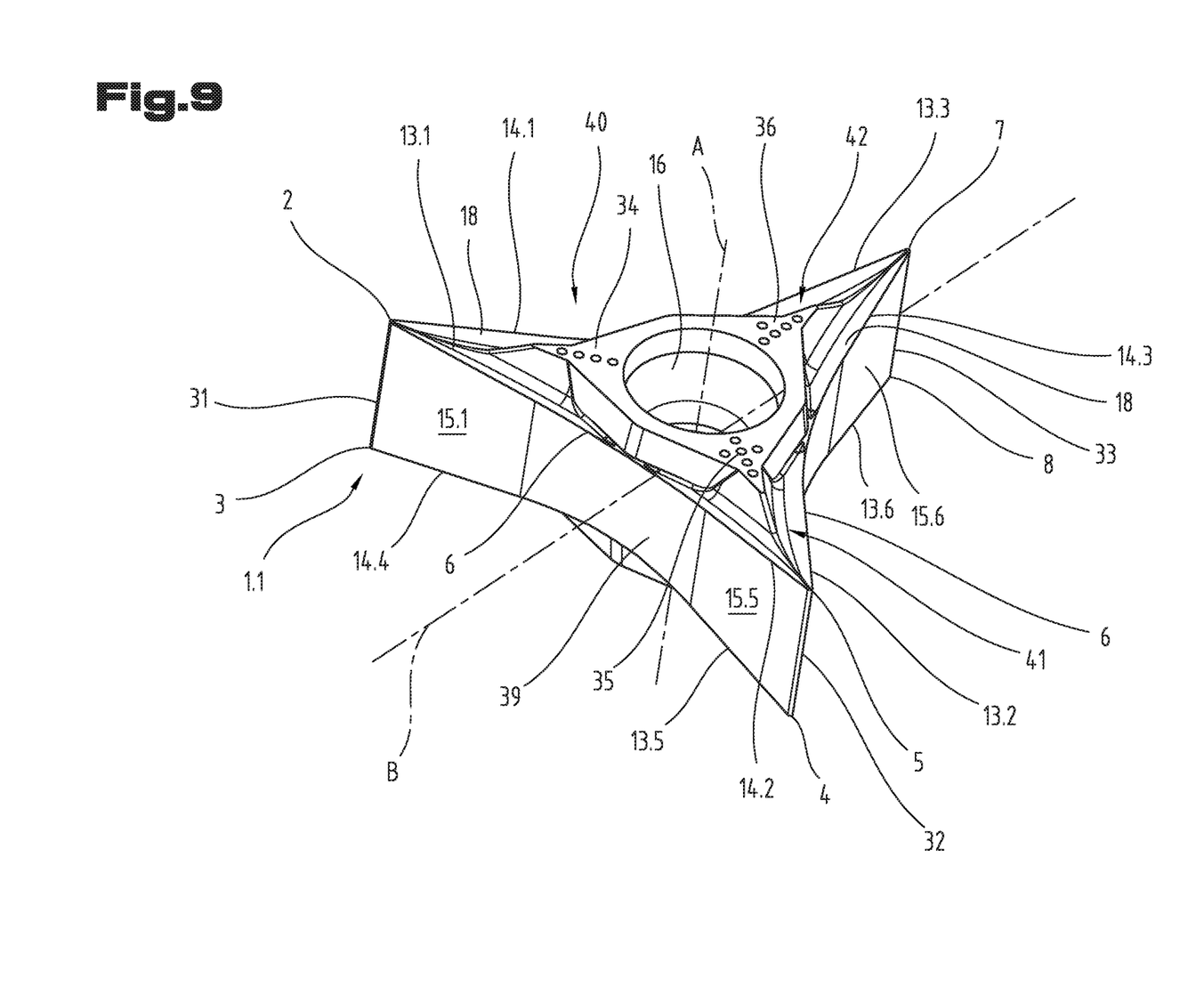

In the embodiments of FIGS. 1 to 8 in a two-fold rotationally symmetrical design there are, for example, on the upper side of the indexable cutting insert 1 two planes H, one defined by the main cutting edge 13.1 and the secondary cutting edge 14.1 at the cutting corner 2, the other defined by the main cutting edge 13.2 and the secondary cutting edge 14.2 at the cutting corner 5. In the same way, two planes H can be spanned on the cutting corners 3 and 4 on the underside. For the 3-fold star-shaped indexable cutting insert 1 of FIGS. 9 to 12, three planes H can be spanned on the upper side alone, as can be seen in FIG. 9, for example. The first upper plane H is define by the main cutting edge 13.1 and the secondary cutting edge 14.1 at the cutting corner 2, the second plane H is defined by the main cutting edge 13.2 and the secondary cutting edge 14.2 at the cutting corner 5, and the third plane H is defined by the main cutting edge 13.3 and the secondary cutting edge 14.3 at the cutting corner 7. On the underside, three planes H can be spanned in the same way at the cutting corners 3, 4 and 8. The term "inner angle" is used to indicate that it is the angle pointing to the inside of the indexable cutting insert 1.

It is also possible that the clearance areas 15.1 to 15.6 are concave or inwardly angled between the mirror-symmetrically opposite cutting edges 13 and 14. Advantageously, however, they are flat surfaces oriented parallel to the first axis of symmetry.

Figure 10:
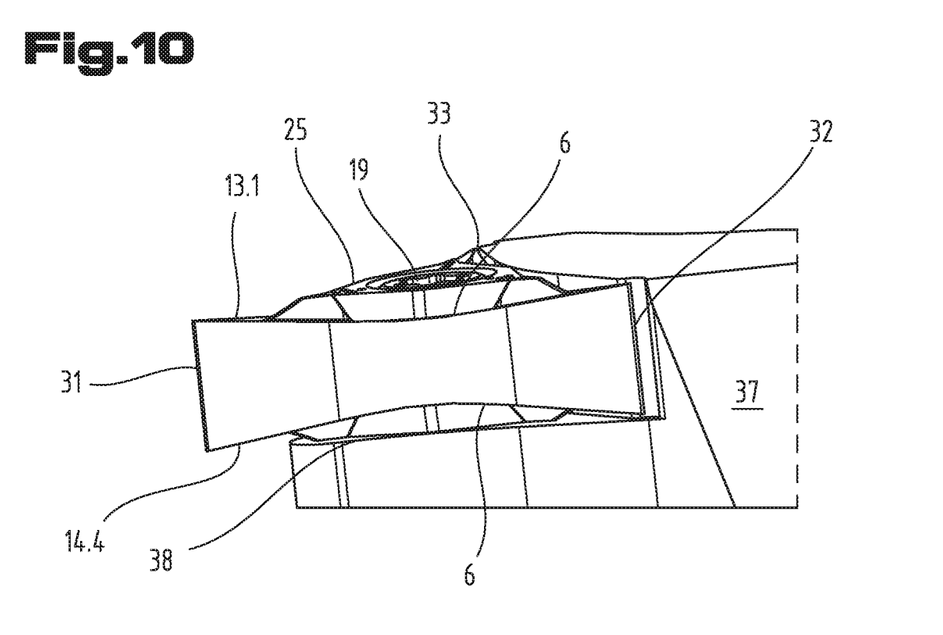
Figure 11:
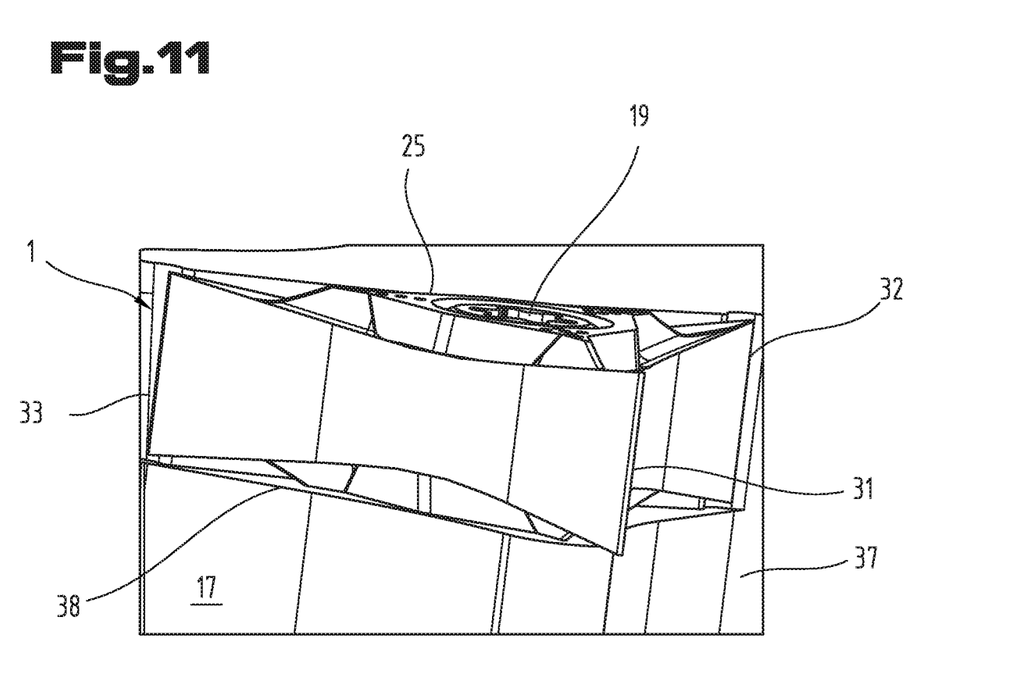

For all embodiments of the indexable cutting insert 1 it is advantageous if the edge region of the respective chip face 25, 26 in the 2-fold embodiment of FIGS. 1 to 8 or 40 to 42 in the 3-fold embodiment of FIGS. 9 to 11, which adjoins the main cutting edges 13.1 to 13.6, forms a concave recess as a chip breaker, forming internal wedge angles λ on the main cutting edges 13.1 to 13.6 of less than 90 degrees. In addition, further surface structures can be arranged in the area of these recesses or at other locations on the chip faces as additional chip breakers 18 (see FIGS. 5 and 8).

For easy orientation of the user when setting up with a new main cutting edge, each chip face 25, 26 and 40 to 42 associated with a particular pair of main cutting edge and secondary cutting edge on the upper side, and the corresponding opposite chip faces on the underside of indexable cutting insert 1, which is not visible in the figures, are preferably provided with a marking 11, 12, 34, 35, 36, which is different from all other markings of other chip faces. The 2-fold rotationally symmetric version of FIGS. 1 to 8 with its four chip faces thus provides for four different markings on the chip faces, the 3-fold rotationally symmetric version of FIGS. 9 to 11 also uses six individual markings to clearly identify the six chip faces. For the embodiments illustrated in FIGS. 1 to 8, there is a first optical marking 11 on the first surface 26 between the through fastening bore 16 and the first cutting corner 5 and a second optical marking 12 between the through fastening bore 16 and the first cutting corner 5. Furthermore, a chip breaker 18 is arranged between each of the two main cutting edges 13 of each of the cutting corners 2, 3, 4, 5, whereby the chip breakers 18 provide an angular surface structure. A smooth clearance area 15 is located between the two front edges 21, 28 and the two insertion edges 29, 30, respectively.

Figure 2:
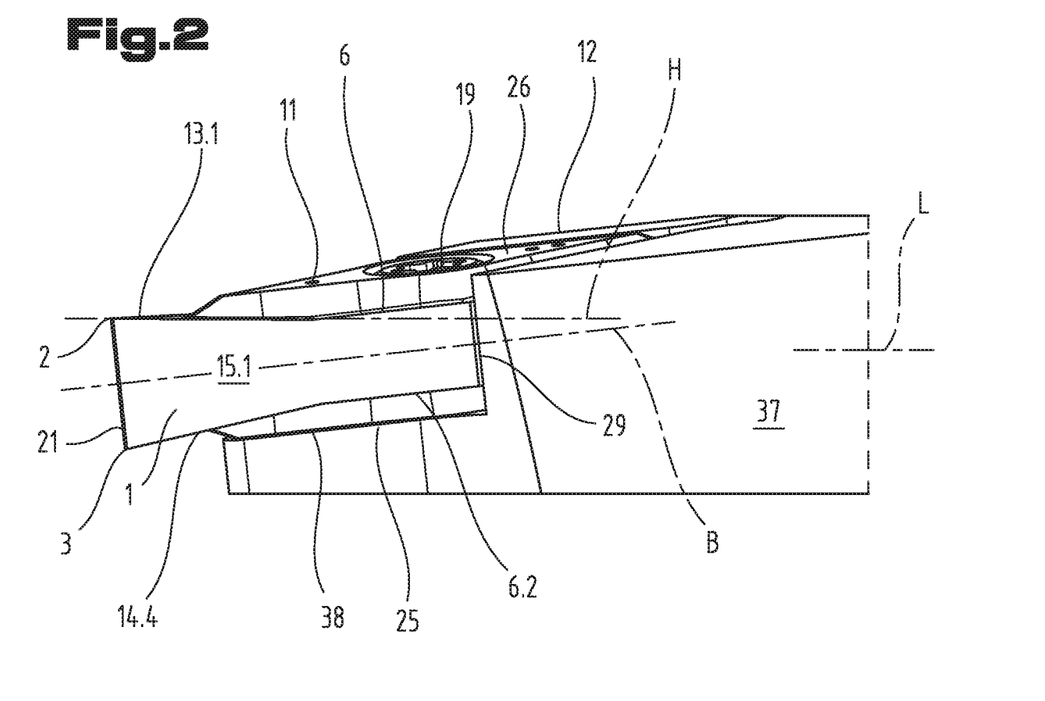

For its use in a material processing machine, the indexable cutting insert 1 is inserted into a cutting insert holder 17 and together with this forms the turning tool. An exemplary embodiment of a cutting insert holder is shown in FIGS. 2 to 6 with inserted cutting insert 1 and in FIGS. 12 to 14 without cutting insert 1. The cutting insert holder 17 is used for holding and fixing the indexable cutting insert 1, which can be detachably fixed by means of a fastening means 19, preferably a screw. The tool composed of both components can be right-handed, left-handed, neutral or with any angle. Further, FIG. 2 shows a first angle, which describes an angle of 90° or less of the first main cutting edge 13.1 with respect to the front edge 21. The same angle is also present in the other connection points of the other main cutting edges 13.2 to 13.6 with respect to the front edges 21, 28.

In FIGS. 2 to 6 you can also see how a cutting insert holder support 38 holds the second surface of the cutting insert 1. It can also be seen that the cutting insert 1 is inserted into an unspecified receiving opening of the basic body 37 up to the first insertion edge 29. In this way the user has a simple and quick way to check the correct insertion of insert 1 into the body 37 of the tool holder. The unspecified image in the basic body 37 essentially has a half negative form of cutting insert 1. A cutting insert holder plane is provided, which extends diagonally to a cutting insert holder base. Since the support surface 38 for the cutting insert 1 is also arranged at an angle with respect to the cutting insert holder base in the base body 37 of the tool carrier, this results in a lowering of the inserted cutting insert 1, the slope of the support surface 38 being such that the first main cutting edge 13.1 or one of the other main cutting edges 13.2 to 13.6 protruding from the holder for the indexable cutting insert are horizontal to a base. This means that the main cutting edges 13 would be perpendicular when using a spirit level or exactly vertical to it when inserted into and fixed to the base body 37.

Figure 3:
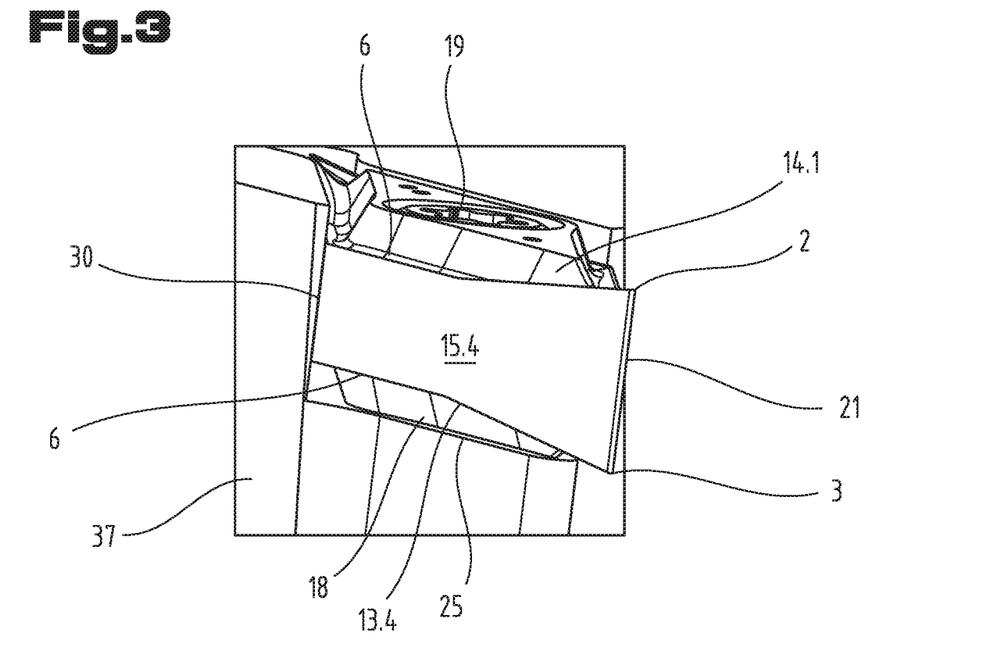
Figure 4:
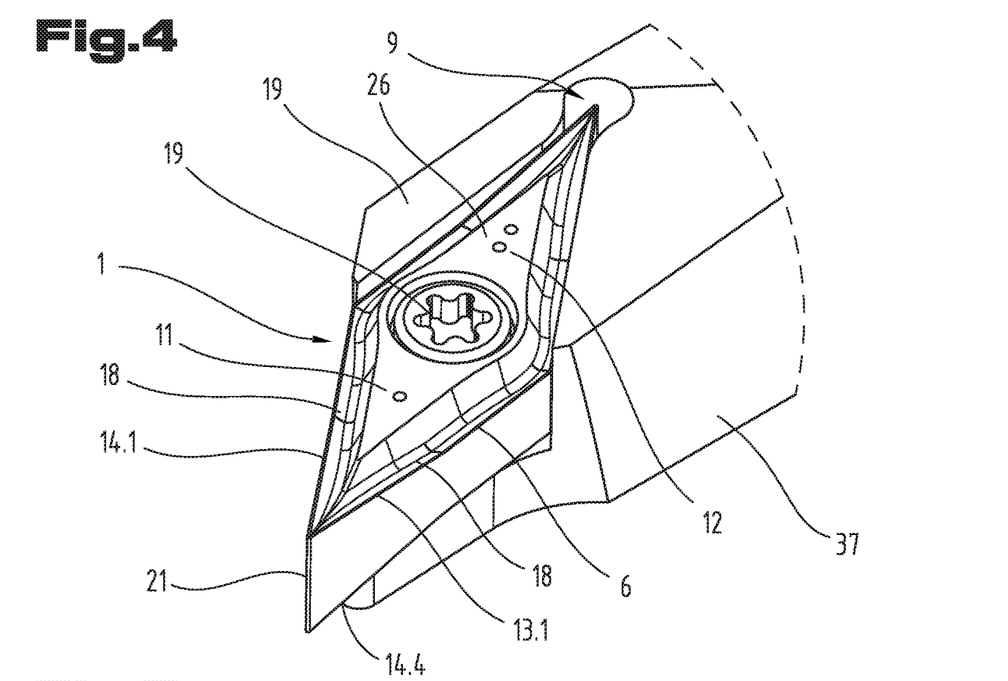
Figure 5:
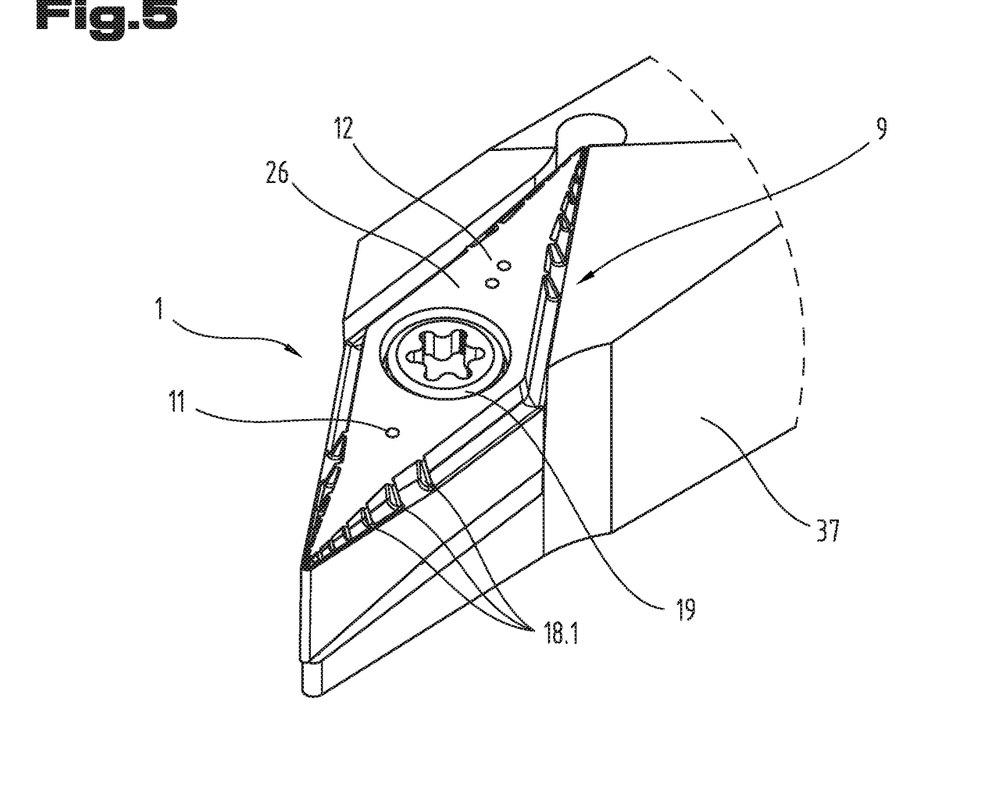
Figure 6:
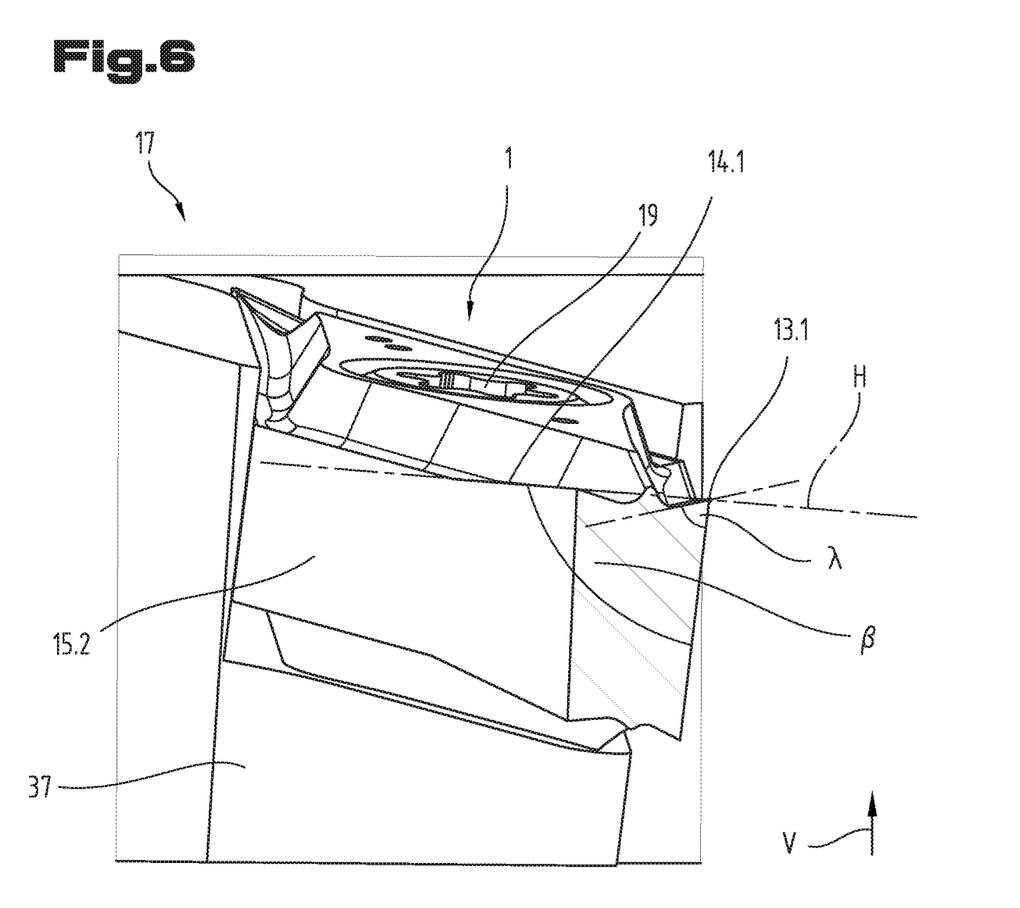

In FIG. 3 you can also see how the second angle ensures that the first front edge 21 is set back from the second cutting corner 2 to the second cutting corner 3. This inclination results from the fact that the support surface 38 is arranged obliquely to the cutting insert holder base.

The cutting insert holder 17 shown and explained here as an example has an elongated basic body 37 with a polygonal cross-section, preferably a rectangular cross-section. Differently shaped basic bodies 37 are possible and even widely used, for example with a cylindrical, pin-shaped section for mounting on the machine tool and a front end that can be designed essentially as required, to which the cutting insert 1 is attached. At this front end, which faces the workpiece, the base body 37 has a recess 9 for receiving the indexable cutting insert 1 and a structure for detachable connection with a fastening means 19 for the indexable cutting insert 1. FIGS. 2 and 3 also show how a fastening means 19 in the form of a screw is present in the through fastening bore 16. The fastening means is used to fix the cutting insert 1 in the basic body 37 of the tool holder, as also shown in FIGS. 2 and 3. The recess 9 has at least one support surface 38 for supporting the indexable cutting insert 1 in a direction radial to the longitudinal axis L of the base body 37. If the fastening means 19 is preferably designed as a screw, the base body 37 therefore has a fastening bore 10 for this screw. Side walls for supporting the indexable cutting insert 1 are also particularly preferably provided parallel to the longitudinal axis L of the base body 37 and/or in the circumferential direction.

Figure 12:
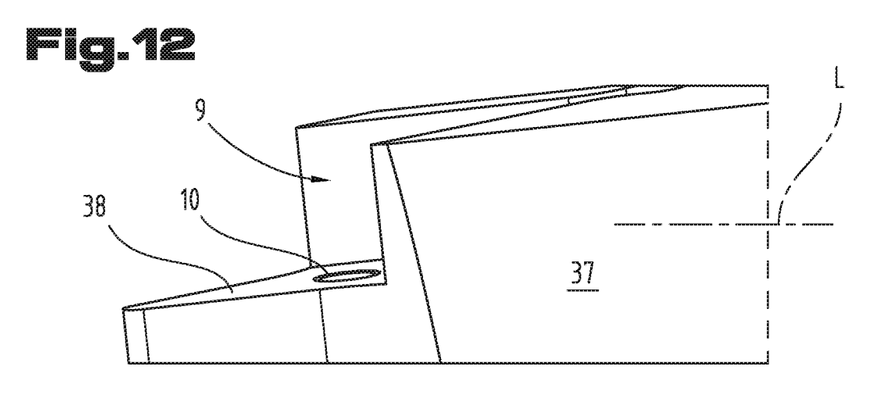
Figure 13:
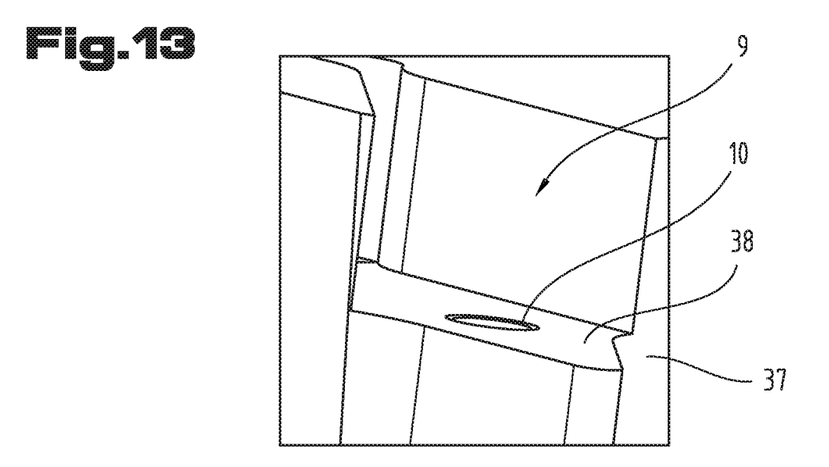
Figure 14:
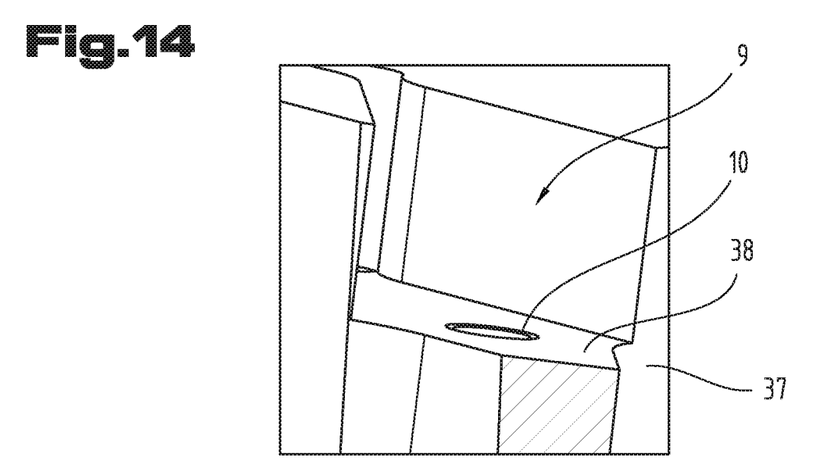

According to the present invention, the support surface 38 is not parallel to the longitudinal axis L and perpendicular to the feed direction of the turning tool 1, 17, but is tilted about two axes, as can be seen clearly in FIGS. 12 to 14. On the one hand, the support surface 38 is rotated about the longitudinal axis L of the basic body in such a way that the thickness of the basic body 37 is less on its outer side, on which the respective active main cutting edge 13.1 to 13.6 is located, than in the central region of the basic body 37. The second axis of the tilting of the support surface 38 is defined by the intersection line between the rotated support surface 38 and a plane perpendicular to the longitudinal axis L of the basic body 17, i.e. a plane perpendicular to the drawing plane in FIG. 12 and parallel to the drawing plane in FIGS. 13 and 14. Depending on the position of the second plane along the longitudinal axis L with respect to the support surface 38, this results in a steep or flat position of the support surface 38 with respect to the longitudinal axis L. The tilting around the second axis is carried out in such a way that the smallest thickness of the base body 37 is between support surface 38 and the outer limit of the base body at the outermost end of the base body 37, as can be seen particularly well in the area of the cross-section through the front end of the cutting insert holder in FIG. 14. FIG. 3 shows how the first front edge 21 is arranged obliquely from the first cutting corner 2 to the second cutting corner 3, set back with respect to the central plane of the basic body 37. This is indicated by a second angle.

Furthermore, the cutting insert 1 forms a first functional side between the first cutting corner 2 and the through fastening bore 16 and a second functional side between the fourth cutting corner 5 and the through fastening bore 16. In the same way, a fourth functional side is formed between the second cutting corner 3 and the through fastening bore and a third functional side is formed between the third cutting corner 4 and the through fastening bore 16.

Due to this embodiment of the cutting insert holder 17, an indexable cutting insert 1 inserted into the recess 9 and supported with its underside on the support surface 38 is also positioned in a correspondingly tilted manner and is fed to the workpiece in this tilted orientation, which enables a cutting geometry that is otherwise not possible with this cutting insert 1. With an indexable cutting insert 1 as shown above in the example of 2-fold and 3-fold rotationally symmetrical embodiments, the desired, pre-defined cutting geometries for all existing main cutting edges 13.1 to 13.6 can be produced in the same, exactly reproducible manner in every rotational position and for both the top and bottom of the indexable cutting insert 1, thus achieving a long functional life of a single, usually elaborately manufactured indexable cutting insert 1. The geometric relationships achievable with this method correspond exactly to those given with conventional arrangements, with the difference, however, that the arrangement according to the invention provides a larger number of cutting edges to which this applies.

If, for example, a clearance angle of 7 degrees is present according to the DIN ISO 1832:2012 standard, this is only present for one side of the cutting insert. With a cutting insert according to the invention with a nominal clearance angle of 0 degrees, the desired clearance angle of real 7 degrees can be achieved in all possible turning and tilting positions by inserting the cutting insert into a suitable cutting insert holder with a tilted support surface for the indexable cutting insert, so that a cutting insert can be used for much longer. This means that the machine can be operated for much longer without changing the cutting insert, which significantly increases productivity.

For each specific cutting edge angle $\gamma$, which the main cutting edges 13.1 to 13.6 form with the plane E oriented orthogonally to the first axis of symmetry A, which contains the associated cutting corners, a configuration can be achieved by selecting a cutting insert holder 17 with a suitably tilted support surface 38, in which advantageously the respective active main cutting edge 13.1 to 13.6 forms a desired angle with the feed direction V of the turning tool 1, 17, preferably orthogonally to this feed direction V.

Although the invention was also explained in the preceding description using the example of plate-shaped cutting inserts, its application to other forms of cutting inserts is possible, whereby any adjustments are within the scope of professional skill.

LIST OF REFERENCE CHARACTERS

1 Cutting insert
2 Cutting corner
3 Cutting corner
4 Cutting corner
5 Cutting corner
6 Side edge
7 Cutting corner
8 Cutting corner
9 Recess
10 Fastening bore
11 Marking
12 Marking
13 Main cutting edges
14 Secondary cutting edges
15 Open spaces
16 Fastening bore
17
18 Chip breaker
19 Fastening means
20
21 Front edge
22
23

24
25 Chip face
26 Chip face
27
28 Front edge
29 Insertion edge
30 Insertion edge
31 Front edge
32 Front edge
33 Front edge
34 Marking
35 Marking
36 Marking
37 Basic body
38 Support surface
39
40 Chip surface
41 Chip surface
42 Chip surface
A First axis of symmetry
B Second axis of symmetry
E Plane parallel to the plane of symmetry with axis B
H Plane of the main cutting edge and adjacent secondary cutting edge
L Longitudinal axis of main body
β. Wedge angle
γ. Cutting edge angle
δ. Front edge angle
ε. Corner angle
λ. Inner wedge angle

The invention claimed is:

1. An indexable cutting insert for a turning tool for material processing machines with a first axis of symmetry, wherein at least a first group of main cutting edges are arranged n-fold rotationally symmetrically with respect to the first axis of symmetry, with n being greater than or equal to 2,
- wherein these main cutting edges converge with respective adjacent first secondary cutting edges in a respective cutting corner of a first group of cutting corners at a corner angle of at most 90 degrees, and having at least one fastening bore passing through the indexable cutting insert parallel or coaxially to the first axis of symmetry,
- wherein these main cutting edges each merge directly into a respective adjoining side edge, which side edges extend parallel to a plane oriented orthogonally to the first axis of symmetry and extend over a corner with an obtuse angle or an arcuate connecting piece to the adjoining secondary cutting edge,
- wherein the indexable cutting insert is constructed rotationally symmetrically by 180 degrees about a second axis of symmetry lying in its central plane and orthogonal to the first axis of symmetry, and in so doing has a second group of main cutting edges, secondary cutting edges and cutting corners, which is rotationally symmetrically opposite the first group of main cutting edges, secondary cutting edges and cutting corners about the second axis of symmetry, and
- wherein at least the main cutting edges, starting directly from the associated cutting corners and extending to the respective adjoining side edges, form a single cutting edge of constant slope having a continuous acute cutting edge angle between 0.1 and 70 degrees relative to the plane oriented orthogonally to the first axis of symmetry.

2. The indexable cutting insert according to claim 1, wherein the cutting corners, which are rotationally symmetrically opposite one another, are each connected by a symmetrically extending front edge with a front edge angle of between 0 and 30 degrees relative to the first axis of symmetry.

3. The indexable cutting insert according to claim 1, wherein at least the main cutting edges are connected to the mirror-symmetrically opposite secondary cutting edges lying opposite one another in mirror symmetry are each separated by a clearance area which, at least in the edge regions adjoining the main cutting edges, encloses an internal angle of between 90 and 60 degrees with a plane which is defined by the main cutting edge and secondary cutting edge adjoining a specific cutting corner.

4. The indexable cutting insert according to claim 1, wherein the groups of main cutting edges, secondary cutting edges cutting corners, corners and arcuate sections which are rotationally symmetrically opposite one another about the second axis of symmetry are connected to one another by edges or surfaces oriented parallel to the first axis of symmetry.

5. The indexable cutting insert according to claim 1, wherein n is equal to 2 or 3 and thus in each case 4 or 6 main cutting edges, secondary cutting edges and cutting corners are present.

6. The indexable cutting insert according to claim 1, wherein a respective edge region of a chip face adjoining the main cutting edges forms a concave recess, forming internal wedge angles of less than 90 degrees.

7. The indexable cutting insert according to claim 1, wherein a respective chip face associated with a certain pair of main cutting edges and secondary cutting edges is provided with a marking which is different from all other markings of other chip faces.

8. A cutting insert holder for a turning tool for material processing machines for receiving and fixing the indexable cutting insert according to claim 1, with an elongated base body with a polygonal cross-section and a recess for receiving the indexable cutting insert and a structure for releasable connection to a fastening means for the indexable cutting insert, the recess having at least one support surface for supporting the indexable cutting insert in a direction radial to a longitudinal axis of the base body,
- wherein the support surface is rotated about the longitudinal axis of the base body and tilted about a second axis which is a line of intersection between the rotated support surface and a plane perpendicular to the longitudinal axis of the base body, the smallest thickness of the base body being below the support surface at an outermost end of the base body;
- wherein the support surface, in any plane orthogonal to the longitudinal axis of the base body, encloses a first acute angle with a plane perpendicular to a working plane of the tool, which first acute angle corresponds to the desired clearance angle; and
- wherein the support surface, in each plane parallel to the working plane of the tool, encloses with a plane parallel to the longitudinal axis of the base body and transversely to the working plane of the tool, a second acute angle which second acute angle corresponds to the cutting edge angle of the plane extending parallel to the longitudinal central plane of the indexable cutting insert to be inserted and its main cutting edges.

9. The cutting insert holder according to claim 8 wherein the support surface, in each plane parallel to the longitudinal axis of the base body and to the working plane of the tool, encloses with a plane parallel to the longitudinal axis of the base body and transversely to the working plane of the tool, a third acute angle which corresponds to the angle between the longitudinal central plane of the indexable cutting insert to be inserted and its main cutting edges plus or minus a desired tool setting angle.

10. A cutting device comprising an indexable cutting insert according to claim 1, a rod-shaped cutting insert holder with a recess at one of its ends for receiving the indexable cutting insert, and fastening means for releasably fixing the indexable cutting insert in the recess of the cutting insert holder.

11. The cutting device according to claim 10 wherein the indexable cutting insert is received in a base body of the cutting insert holder, the cutting device further comprising a first front edge and a second front edge, the first front edge forming a first cutting corner and a second cutting corner at each end and the second front edge forming a third cutting corner and a fourth cutting corner at each end, wherein a first surface is present between the first cutting corner and the fourth cutting corner, wherein the at least one fastening bore comprises a through fastening bore formed in each case into the first surface and into a second surface, wherein the first surface and the second surface are designed plane-parallel to one another, wherein two main cutting edges each respectively extend from each of the cutting corners up to a section transition and then merge into a side edge, wherein the side edges extend to a first insertion edge or to a second insertion edge, wherein from the main cutting edges up to the two front edges a first angle is present, wherein the base body has a receptacle with a support surface for the indexable cutting insert, wherein the support surface is arranged obliquely to a base in such a way that the first angle is intercepted in such a way that the main cutting edges can be arranged horizontally or parallel to a base.

12. The cutting device according to claim 11, wherein the first front edge is arranged obliquely from the first cutting corner to the second cutting corner at a second angle, and/or that the second front edge is arranged obliquely from the fourth cutting corner to the third cutting corner at a further angle.

13. The cutting device according to claim 11, wherein a fastening means for fixing the indexable cutting insert in the base body can be inserted into the through fastening bore of the first surface or the second surface.

14. The cutting device according to claim 11, wherein a first functional side is formed between the first cutting corner and, on the one hand, the through fixing bore, and a second functional side is formed between the fourth cutting corner and, on the other hand, the through fixing bore, and/or wherein a fourth functional side is formed between the second cutting corner and, on the one hand, the through fixing bore and a third functional side is formed between the third cutting corner and, on the other hand, the through fixing bore.

15. The cutting device according to claim 11, wherein a chip breaker is arranged between the two cutting edges of each of the cutting corners.

16. The cutting device according to claim 11, wherein a smooth clearance area is provided between each of the two front edges and the two insertion edges.

* * * * *